US005314650A

United States Patent [19]

Adler et al.

[11] Patent Number: 5,314,650

[45] Date of Patent: May 24, 1994

[54] METHOD FOR EXTRUDING HONEYCOMBS

[75] Inventors: Meryle D. W. Adler, Corning; Rodney D. Bagley, Big Flats; Rodney I. Frost, Corning, all of N.Y.; John G. Lanning, New Bedford, Mass.; H. Gordon Shafer, Jr., Rockstream, N.Y.

[73] Assignee: Corning Incorporated, Corning, N.Y.

[21] Appl. No.: 21,255

[22] Filed: Feb. 23, 1993

[51] Int. Cl.[5] .............................................. B29C 47/00

[52] U.S. Cl. ...................................... 264/56; 264/142; 264/177.12; 264/211.11; 264/67; 425/308; 425/461

[58] Field of Search ................ 264/56, 142, 158, 163, 264/165, 177.11, 177.12, 177.16, 210.1, 211.11, 67; 425/308, 461

[56] References Cited

U.S. PATENT DOCUMENTS

| | | | |
|---|---|---|---|
| 1,553,573 | 9/1925 | Tanzi | 425/306 |
| 2,775,788 | 1/1957 | Andrew | 264/142 |
| 3,010,150 | 11/1961 | Meakin | 425/331 |
| 3,108,055 | 10/1963 | Grant | 204/196 |
| 3,295,469 | 1/1967 | Vassalli | 425/307 |
| 3,564,328 | 2/1971 | Bagley et al. | 313/220 |
| 3,836,302 | 9/1974 | Kaukeinen | 425/197 |
| 3,899,326 | 8/1975 | Frost et al. | 264/177.12 |
| 4,118,456 | 10/1978 | Blanding et al. | 264/177 R |
| 4,408,972 | 10/1983 | Layfield | 425/8 |
| 4,621,936 | 11/1986 | Hansson et al. | 401/215 |
| 4,687,433 | 8/1987 | Ozaki et al. | 425/464 |
| 4,725,391 | 2/1988 | Bardhan et al. | 264/82 |
| 4,877,766 | 10/1989 | Frost | 502/439 |
| 4,983,343 | 1/1991 | Lund | 264/142 |

*Primary Examiner*—Jan H. Silbaugh
*Assistant Examiner*—Christopher A. Fiorilla
*Attorney, Agent, or Firm*—Michael L. Goldman; Kees van der Sterre

[57] ABSTRACT

An extrusion die is used for producing ceramic honeycomb materials. It is particularly useful in producing such extrudates in sheet form by configuring the die in the form of a cylinder and providing a cutting device proximate to the exterior of the cylinder so that when relative rotation is imparted between the cutter and the cylinder, a honeycomb sheet is removed. A cover can be provided over the exterior surface of the cylindrically-shaped die to permit formation of honeycomb extrudates in pellet form.

15 Claims, 15 Drawing Sheets

FIG. 13
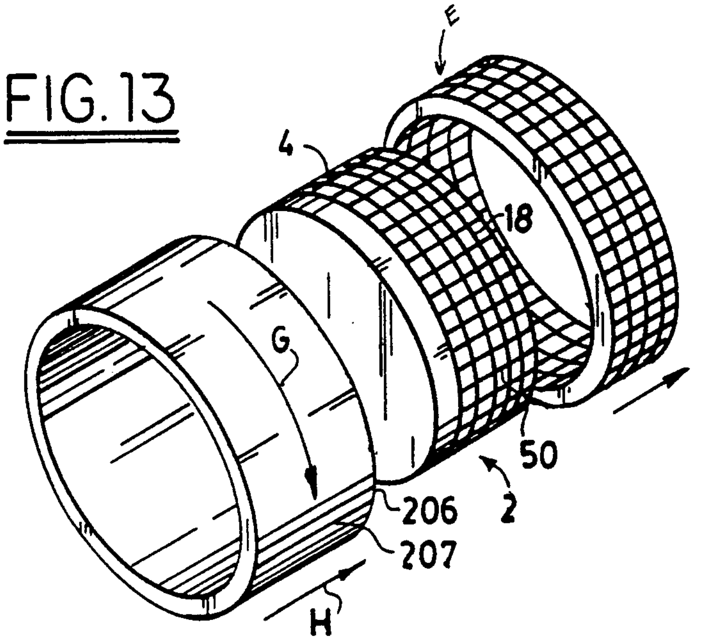
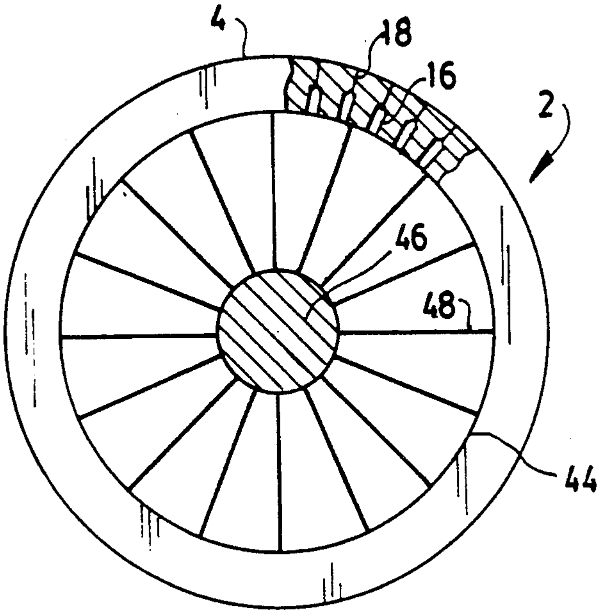
FIG. 14
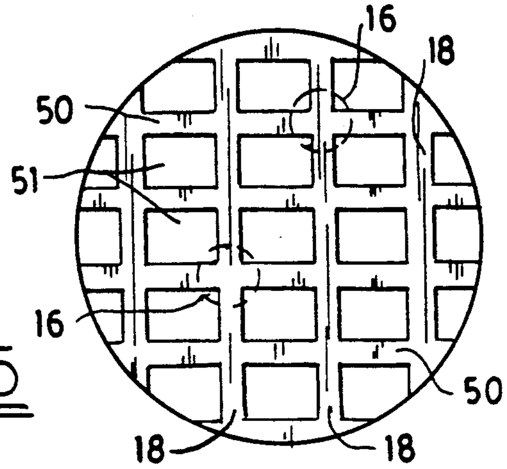
FIG. 15

METHOD FOR EXTRUDING HONEYCOMBS

FIELD OF THE INVENTION

The present invention relates to extruding ceramic honeycomb structures.

BACKGROUND OF THE INVENTION

Ceramic honeycomb structural bodies are effective as catalyst carriers for purifying exhaust gases of internal combustion engines and as filters for fine particle removal. These honeycomb structural bodies are usually made of a ceramic material such as cordierite, alumina, silicon carbide, and the like, and owing to their configurations, they are generally produced by an extrusion method.

In order for honeycomb structures to function efficiently as catalytic converters, it is necessary that their cells provide a substantially large surface area for catalytic material to react with the exhaust gases. Also, the cell walls must have a substantially thin cross-sectional dimension to provide a large open frontal area to reduce back pressure within the exhaust system. However, the thin walled structure must have sufficient mechanical and thermal integrity to withstand normal automotive impact and thermal requirements.

In the past, it has been customary to form extrusion dies for forming thin-walled honeycomb structures from a solid die body by saw-cutting discharge passages in the outlet face of the die body and drilling rather lengthy feed holes into the inlet face of the die body which communicate with such discharge passages, as shown in U.S. Pat. No. 3,790,654 to Bagley. As further shown in the Bagley patent, the feed holes may communicate with each intersecting passage or every other intersection, as desired. However, in both cases the feed holes extend a substantial distance through a unitary die body.

In order for the extruded material to coalesce within the discharge passages, it is necessary for the passages to have sufficient length so that the extruded material will have time to flow transversely within slots to knit into a unitary grid prior to being longitudinally discharged from the outlet face of the die. Alternatively, additional feed holes may be provided in communication with the slot gridwork to reduce the amount of transverse flow required to provide such a unitary cellular matrix prior to discharge from the die face.

In the past, planar extrusion dies have been utilized to form ceramic honeycomb structures. Examples of such extrusion systems are disclosed in U.S. Pat. Nos. 3,836,302 to Kaukeinen, 4,118,456 to Blanding, et al., 4,687,433 to Ozachi, et al., and 4,877,766 to Frost. Such devices work well in extruding single piece structures having relatively small cross-sectional areas. The cross-sectional area of honeycomb structures is, however, limited by the size of the die used to form them. This becomes a problem when it is necessary to produce honeycomb structures with large cross-sectional areas. It is simply not cost-effective to manufacture a large one-piece honeycomb structure with a planar extrusion die. Instead, small component pieces of such large structures are separately extruded through planar dies, and the pieces are then fitted together and sealed with frit. Due to its time-consuming and labor-intensive nature, this procedure is not particularly satisfactory. There, thus, continues to be a need for techniques of producing large ceramic honeycomb materials in an efficient and cost-effective fashion.

SUMMARY OF THE INVENTION

The present invention relates to the formation of honeycomb structures in sheet form having a length, a width, and a thickness defined by opposed planar surfaces. The sheet contains walls which extend without substantial interruption between these planar surfaces to define open cells across the thickness of the honeycomb sheet. The walls extend substantially along the length and the width of the honeycomb sheet to define cells across these dimensions of the sheet.

The elongate honeycomb sheet is formed with an extrusion die configured as a longitudinally-extending body with a continuous (preferably, cylindrical) outer surface containing discharge passages. One set of discharge passages extends circumferentially around the extrusion die and are spaced along its length. A second set of discharge passages extends across the length of the extrusion die and are spaced from each other around the die's circumference. As a result, the discharge passages intersect one another throughout the outer surface of the cylinder. A central inner passage extends longitudinally through the die and feed holes are directed radially outwardly from that passage to conduct material to the discharge passages and outwardly away from the die in the form of a honeycomb extrudate. Procedures for forming such dies are also disclosed.

The apparatus for forming honeycomb structures in sheet form additionally includes conveying equipment to advance a formable material into the die, through the discharge passages and away from the outer surface. Also required is a cutting device which can be positioned near the outer surface to cut material extruded through the discharge passages. To effect such cutting, it is necessary to provide the apparatus with structure to impart relative rotation between the extrusion die and the cutting device so that any elongate sheet of honeycomb extrudate is removed from the outer surface of the die.

In use, formable material is passed into the inner passage of the die, through the feed holes, and into the discharge passages. After the discharge passages are filled, the material advances away from the die's outer surface as a honeycomb extrudate. When relative rotation is imparted between the die and the cutting device, the honeycomb extrudate is removed from the die as an elongate sheet. Alternatively, it is possible to produce annular honeycomb arrangements with this die.

BRIEF DESCRIPTION OF THE DRAWINGS

FIG. 13 is a perspective view of another alternative embodiment for a cutter used in conjunction with the extrusion apparatus of the present invention.

FIG. 14 is an end cross-sectional view of an extrusion apparatus in accordance with the present invention provided with internal baffles.

FIG. 15 is a magnified view of the portion of FIG. 1 within oval 15—15.

DETAILED DESCRIPTION OF THE DRAWINGS

Figure 1:
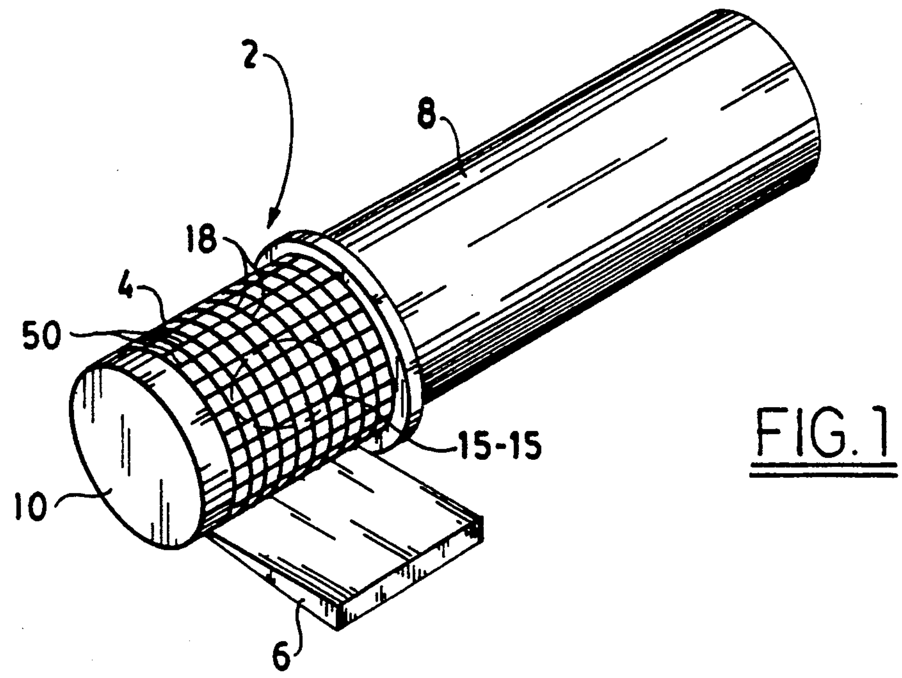
FIG. 1 is a perspective view of an extrusion apparatus in accordance with the present invention.

FIG. 1 is a perspective view of an extrusion apparatus in accordance with the present invention. This device includes rotary die 2 having outer surface 4 to which cutter 6 is proximate. One end of rotary die 2 is connected to drive housing 8, while the other end is provided with end wall 10. As described in more detail below, outer surface 4 has circumferentially extending discharge passages 18 which are spaced axially along outer surface 4 of rotary die 2. Also provided are longitudinally-extending discharge passages 50 which are spaced from one another around the circumference of outer surface 4.

Figure 2:
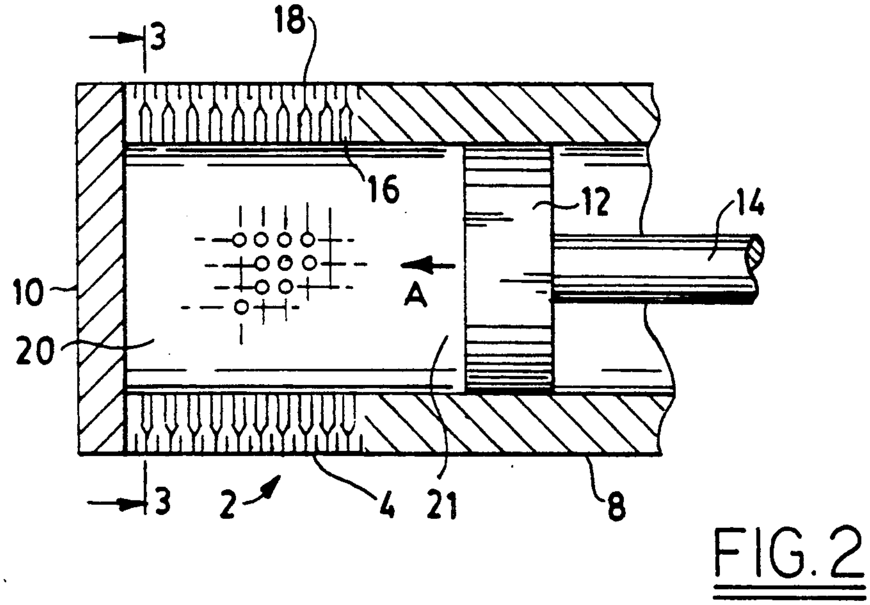
FIG. 2 is a side cross-sectional view of a portion of the extrusion apparatus of FIG. 1.
Figure 3:
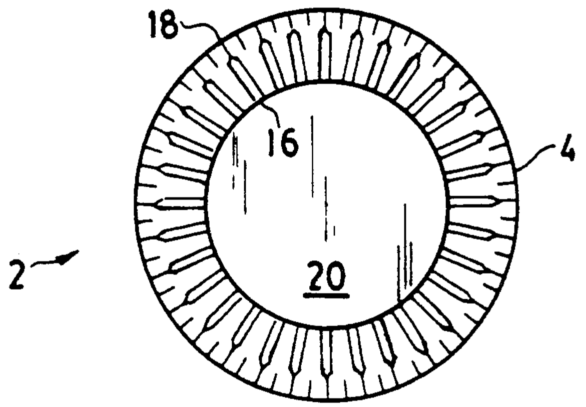
FIG. 3 is a cross-sectional view of the extrusion apparatus of the present invention taken along line 3—3 of FIG. 2.

FIG. 2 is a side cross-sectional view of the extrusion apparatus of FIG. 1. As shown, housing 8 contains rod 14 which urges piston 12 axially. During extrusion, piston 12 and rod 14 move in the direction of arrow A to advance material from passage 21 into chamber 20, through feed holes 16, and into discharge passages 18. Material traveling through discharge passages 18 also fills discharge passages 50 so that a honeycomb extrudate is discharged from die 2 at outer surface 4. FIG. 3 is an end cross-sectional view of the extrusion apparatus of the present invention taken along line 3—3 of FIG. 2.

Figure 4:
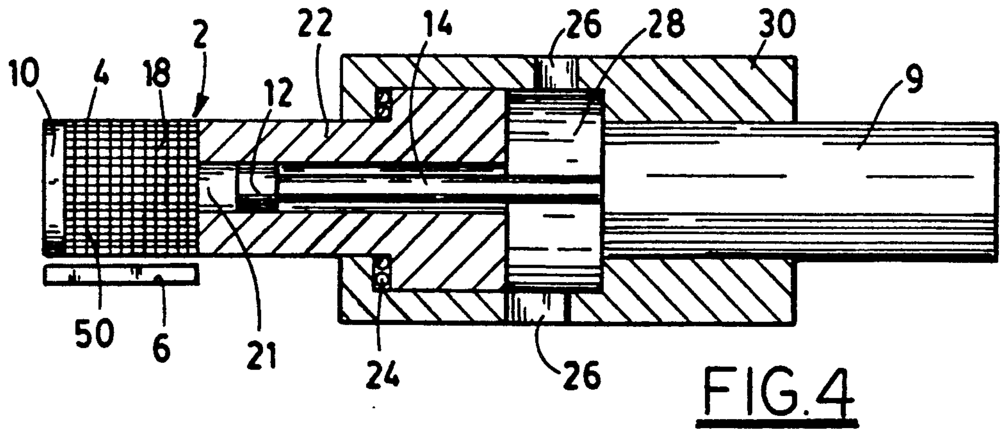
FIG. 4 is a partial side cross-sectional view of one embodiment of the extrusion apparatus of the present invention.

FIG. 4 is a partial side cross-sectional view of one embodiment of the extrusion apparatus of the present invention. The identity and function of die 2, outer surface 4, cutter 6, end wall 10, piston 12, rod 14, discharge passages 50 and 18, passage 21 are all discussed supra with respect to FIGS. 1-3. Surrounding passage 21 is barrel 22 within which piston 12 and rod 14 reciprocate. Die 2 and barrel 22 are made to rotate together with respect to housing 30 which is stationary. Such rotation is promoted by incorporating bearing 24 between barrel 22 and stationary housing 30. Housing 30 is also provided with opening 26 leading to feed chamber 28. Extending from the end of housing 30 opposite that of die 2 is drive motor or hydraulic ram 9. In operation, material to be extruded is charged through opening 26 and chamber 28 into passage 21 while piston 12 is retracted proximate to drive motor 9. Drive motor 9 then urges piston 12 and rod 14 toward die 2 so that material within passage 21 is forced through die 2 to outer surface 4. Alternatively, formable material could be charged through both ends of the die by incorporation of material conveying equipment (like that to the right of die 2 in FIG. 4) on the left side thereof. This permits substantially continuous feeding of material to die 2, because, while one piston 12 is being retracted toward drive motor 9 to load more formable material, the other is advancing toward die 2. Such an arrangement is also useful where the extrusion die is quite long. It should also be recognized that a screw or another type of continuous extruder could be used instead of piston 12 and its associated structure.

Figure 5:
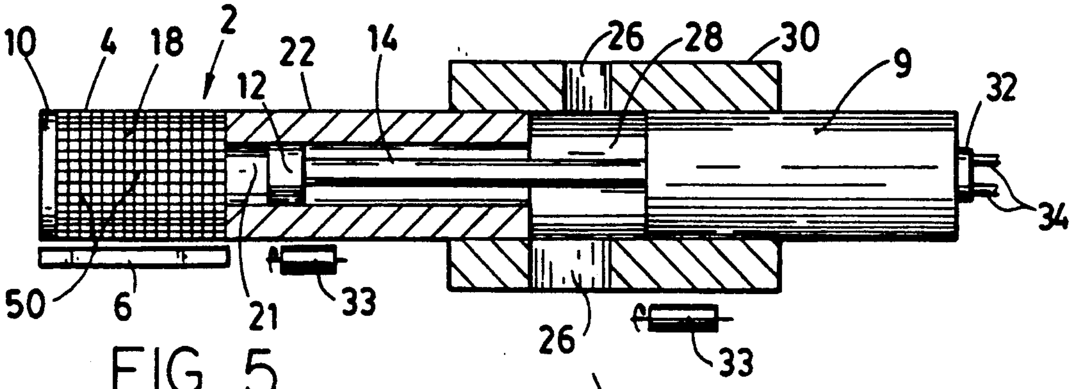
FIG. 5 is a partial side cross-sectional view of another embodiment of the extrusion apparatus of the present invention.

FIG. 5 is a partial side cross-sectional view of another embodiment of the extrusion apparatus of the present invention. Die 2, outer surface 4, cutter 6, end wall 10, piston 12, rod 14, passage 21, barrel 22, opening 26, chamber 28, housing 30, and drive motor 9 are all discussed above with respect to FIG. 4. The essential difference between the devices of FIGS. 4 and 5 is that the entire unit of the latter rotates about its longitudinal axis. The unit is supported for such rotary movement by bearings schematically denoted as 33. Further, FIG. 5 has rotary seal 32 that receives hydraulic fluid lines 34 to drive motor 9 which is in the form of a hydraulic cylinder. The device of FIG. 5 operates in substantially the same fashion as that of FIG. 4.

Figure 6:
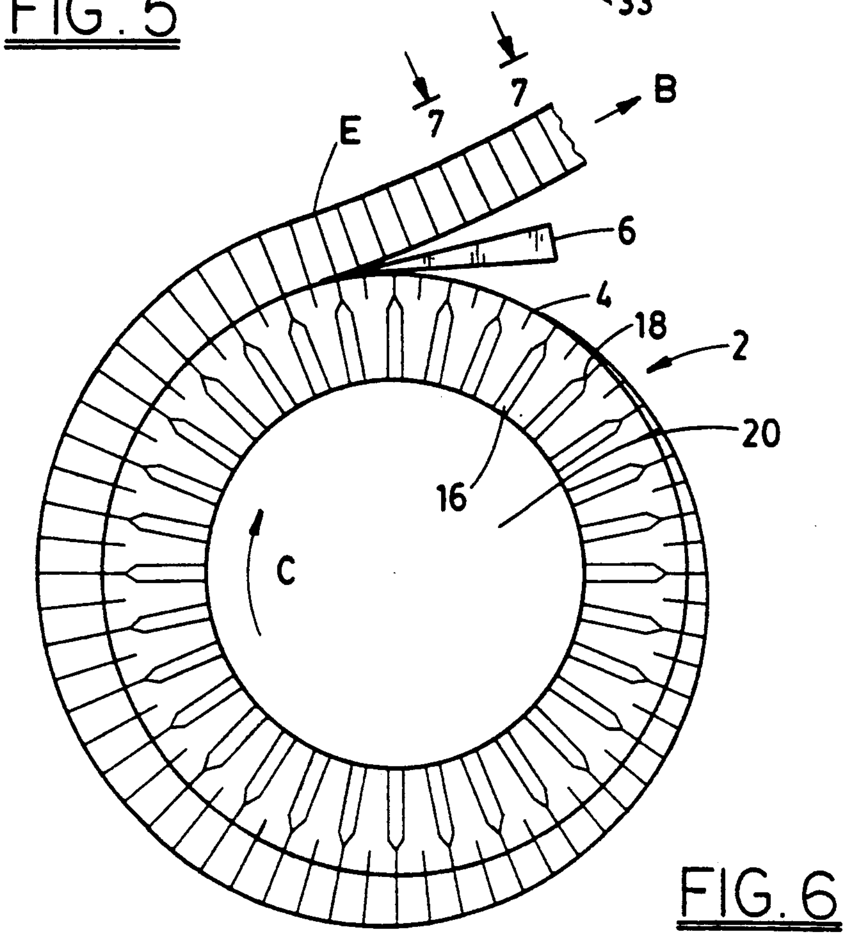
FIG. 6 is an end cross-sectional view of one embodiment of the extrusion apparatus of the present invention, producing a honeycomb sheet.

FIG. 6 is an end cross-sectional view of one embodiment of the extrusion apparatus of the present invention, producing a honeycomb sheet. Extrusion die 2, outer surface 4, cutter 6, feed holes 16, discharge passages 18, and chamber 20 have all been identified with respect to FIG. 1. As material within chamber 20 is compressed by piston 12 (shown in FIG. 1), it is forced through feed holes 16, into discharge passages 18 and 50 (not shown), and onto outer surface 4 to form a honeycomb extrudate E. In this embodiment, with die 2 being rotated in the direction shown by arrow C (by structure apparent to these skilled in the art), such extrudate E formation begins to occur at a clockwise advanced location from cutter 6. As die 2 rotates, the thickness of extrudate E increases until it is removed by stationary cutter 6 which is either in sliding contact with or proximate to outer surface 4. Extrudate E is then withdrawn in the direction shown by arrow B. The thickness of the extrudate removed from die 2 can be varied by altering the volumetric flow rate of material through die 2 or by modifying the rotational speed of die 2. It is alternatively possible to maintain die 2 in a stationary position and rotate cutter 6 (also by structure apparent to those skilled in the art) in sliding contact with or proximate to outer surface 4. Yet another possibility is to rotate both cutter 6 and die 2.

After extrusion and separation from die 2, extrudate E, when in a the form of a green body for preparation of ceramic materials, can be dried in a dielectric dryer and then sintered. Besides ceramic materials, the present invention can be used to form plastics, rubber, glass precursors, glass-ceramic precursors, metals, etc.

Figure 7:
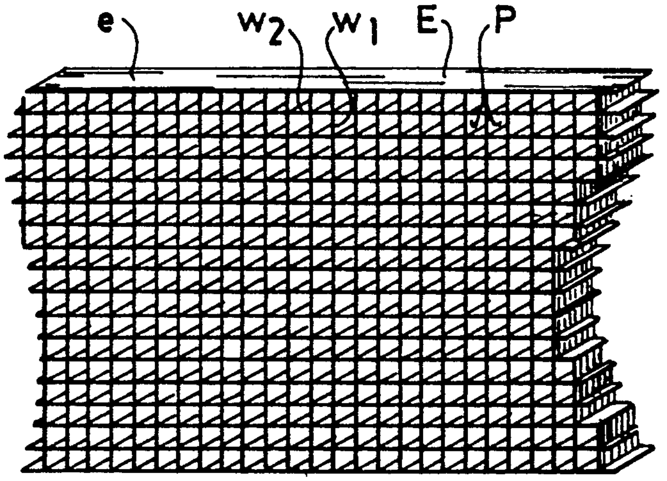
FIG. 7 is a perspective view of a honeycomb sheet in accordance with the present invention taken along line 7—7 of FIG. 6.

FIG. 7 is a perspective view of a honeycomb extrudate sheet E made in accordance with the present invention. This honeycomb extrudate E sheet is provided with individual honeycomb cells P which are separated from adjacent cells by intersecting walls $W_1$ and $W_2$. Also shown in FIG. 7 is a substantially smooth edged surface e which is formed by providing the longitudinally-spaced edges of die 2 at outer surface 4 with an annular tapered portion substantially like that taught by U.S. Pat. No. 3,836,302, to Kaukienen. The density of honeycomb cells P in extrudate E is usually 0.155 to 248 cells per square centimeter.

Figure 8:
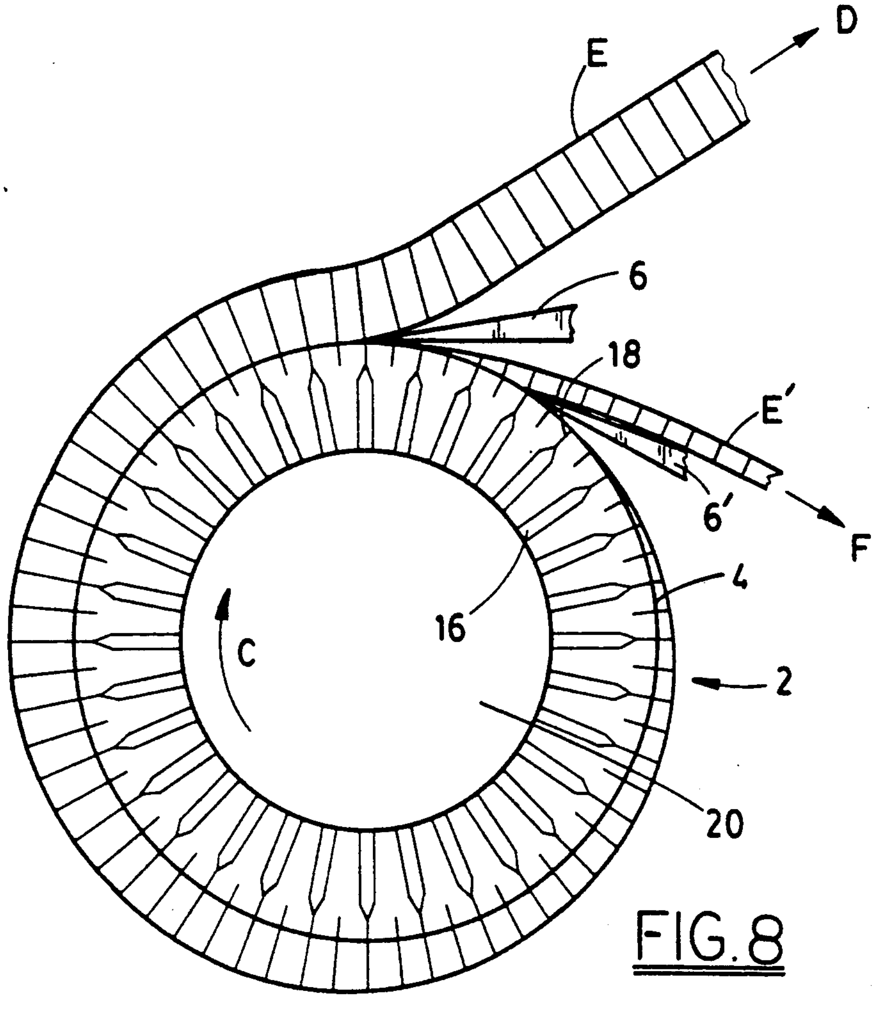
FIG. 8 is an end cross-sectional view of another embodiment of the extrusion apparatus of the present invention, producing a pair of honeycomb sheets.

FIG. 8 is an end cross-sectional view of another embodiment of the extrusion apparatus of the present invention which produces a pair of honeycomb sheets. The apparatus in FIG. 8 and its component parts are substantially similar to that of FIG. 6. However, the apparatus of FIG. 8 is additionally provided with a second cutter 6' with which material extruded to outer surface 4 between cutters 6 and 6' is removed as extrudate E' in the direction shown by arrow F. This procedure is useful where it is necessary to decrease the thickness of the extrudate, and this cannot be satisfactorily achieved by varying the volumetric flow rate of material through the die or the rate of rotation of the die and/or the cutter. In FIG. 8, extrudate E would be waste. However, alternatively, it may be possible to position cutter 6 with respect to cutter 6' so that extrudates E and E' can both be used.

Figure 9:
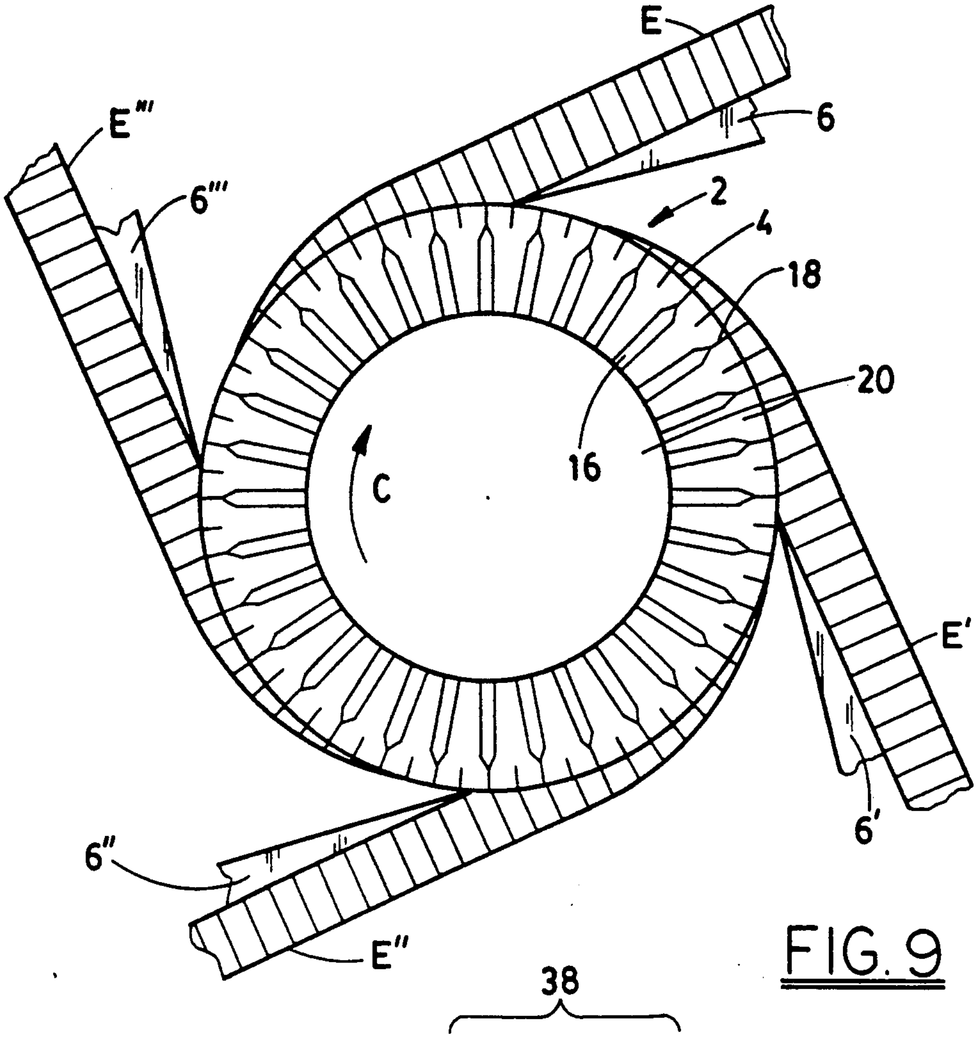
FIG. 9 is an end cross-sectional view of another embodiment of the extrusion apparatus of the present invention, producing four honeycomb sheets.

FIG. 9 is an end cross-sectional view of another embodiment of the extrusion apparatus of the present invention which produces four honeycomb sheets. FIG. 9 and its components are substantially similar to those of FIG. 6 except that the apparatus of FIG. 9 is additionally provided with cutters 6', 6'', and 6''' which remove extrudates E', E'', and E''', respectively. The arrangement of FIG. 9 permits a plurality of honeycomb extrudate sheets to be removed from die 2. Ideally, such extrusion would be achieved by high volumetric flow rates of material to be extruded and/or slow relative rotation between die 2 and cutters 6, 6', 6'', and 6'''.

Figure 10:
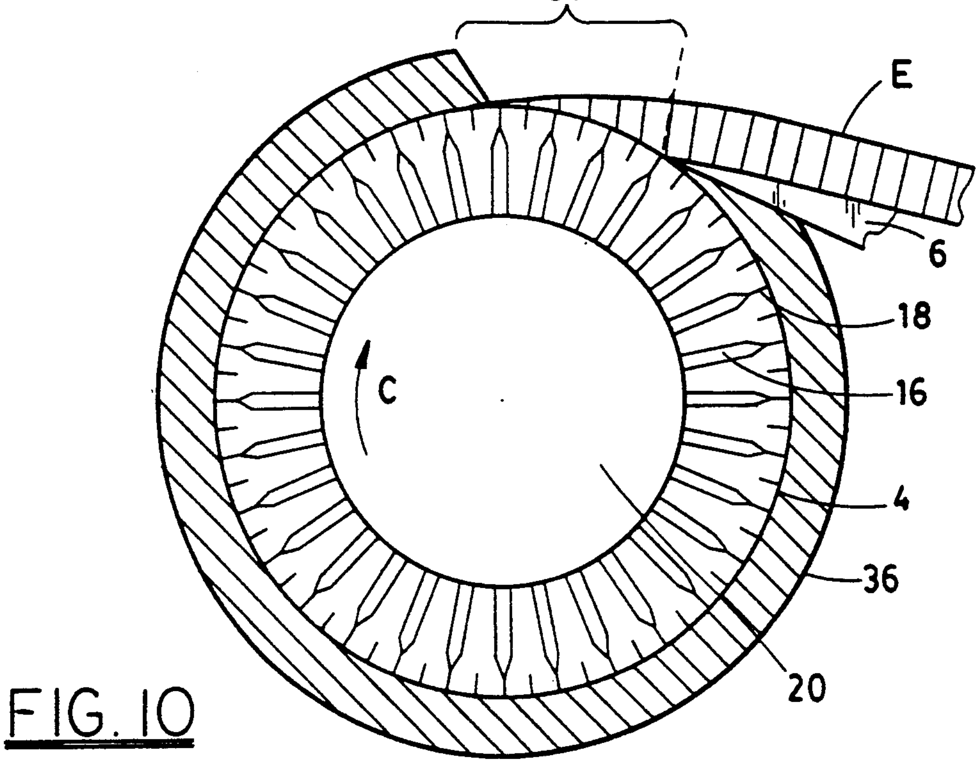
FIG. 10 is an end cross-sectional view of another embodiment of the extrusion apparatus of the present invention provided with an external mask.

FIG. 10 is an end cross-sectional view of another embodiment of the extrusion apparatus of the present invention with an external mask. The device of FIG. 10 and its component parts are substantially the same as that of FIG. 6. The key distinction is that the device of FIG. 10 is provided with an external mask 36 contiguous with almost all of outer surface 4 of die 2. As a result, material is only extruded at outer surface 4 at extrusion zone 38 which extends longitudinally across die 2. Feed holes 16 and discharge passages 18 leading to other portions of outer surface 4 are blocked by external mask 36. This arrangement is particularly useful when the volumetric flow rate of material to be extruded cannot be reduced to a level sufficient to form an extrudate sheet of suitable thickness. Similarly, the arrangement is also useful where the relative rate of rotation of die 2 and cutter 6 cannot be increased sufficiently.

Figure 11:
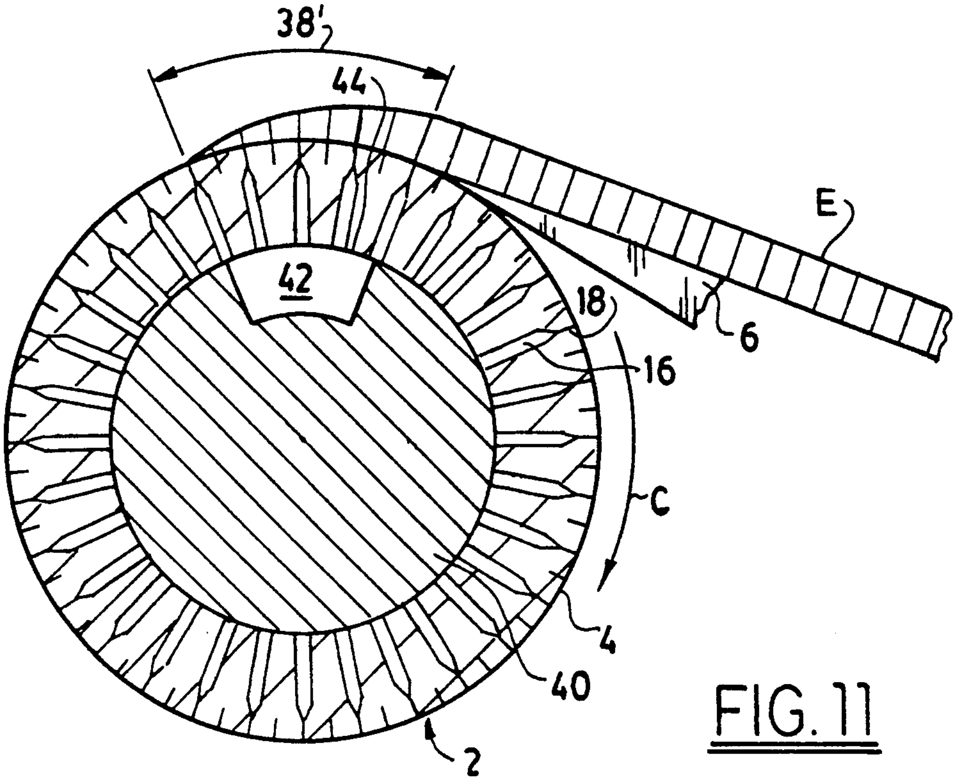
FIG. 11 is an end cross-sectional view-of another embodiment of the extrusion apparatus of the present invention with an internal mask.

FIG. 11 is an end cross-sectional view of another embodiment of the extrusion apparatus of the present invention provided with an internal mask. Again, FIG. 11 and its component parts are substantially the same as those in FIG. 6 except that the device of FIG. 11 is provided with an internal mask 40 which blockingly contacts most of the cross-section of chamber 20, leaving only sub-chamber 42. As a result, only the portion of inner surface 44 of die 2 which does not contact internal mask 40 permits extrusion. The portion of inner surface 44 which is not covered by internal mask 40 is available to receive extrudable material from chamber 42 and to conduct that material to surface 4 of die 2 at extrusion zone 38'. Internal mask 40 prevents extrusion at any location along outer surface 4 besides that of extrusion zone 38' which also extends longitudinally across die 2. Like the apparatus of FIG. 10, the device of FIG. 11 permits production of extrudate sheets of a suitable thickness where the volumetric flow rate of material cannot be reduced sufficiently. Similarly, the arrangement is also useful where the relative rate of rotation of die 2 and cutter 6 cannot be increased sufficiently.

Figure 12:
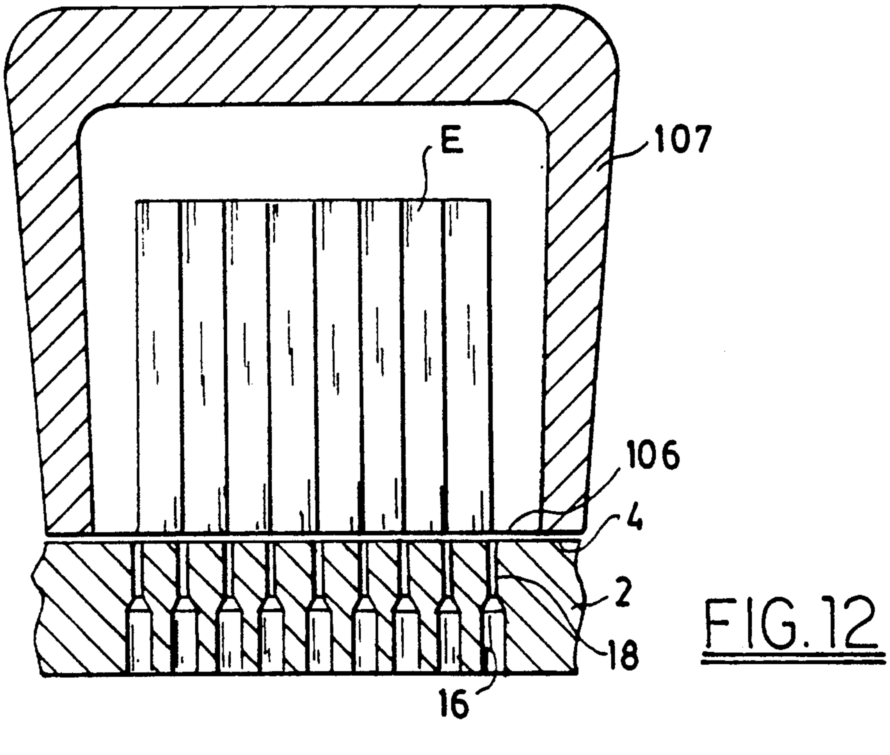
FIG. 12 is a side cross-sectional view of one alternative embodiment for a cutter used in conjunction with the extrusion apparatus of the present invention.

FIG. 12 is a cross-sectional view of an alternative embodiment for a cutter useful in conjunction with the extrusion die of the present invention. As shown, extrudate E which passes through feed holes 16 and discharge passages 18 and 50 (not shown) to surface 4 is cut by wire 106 which extends across frame 107. As with cutter 6 of FIG. 6, wire 106 of FIG. 12 operates by virtue of relative rotation between the cutter and outer surface 4 of die 2.

FIG. 13 is a perspective view of another alternative embodiment for a cutter useful in conjunction with the extrusion die of the present invention. In this form of the present invention, cutter housing 207 is in the form of a hollow cylinder with a central passage. One end of this cylinder is provided with sharp cutting edge 206 to remove extrudate on outer surface 4 of die 2 as housing 207 is advanced in the direction shown by arrow H. Die 2 fits snugly within the passage of housing 207 so that as housing 207 moves over die 2, sharp cutting edge 206 cuts extrudate residing on outer surface 4. Such cutting is aided by rotational movement of housing 207 in the direction shown by arrow G. Alternatively, if the extrudate is a plastic, by heating. Unlike the other embodiments of the present invention depicted supra, FIG. 13 produces a honeycomb extrudate E in the form of a ring as shown. This configuration is achieved by extruding until the desired cylindrical wall thickness is achieved for the extrudate. Cutter 206, moving in the direction of arrow H, then cuts the annular extrudate from outer surface 4 of die 2.

FIG. 14 is an end cross-sectional view of an extrusion apparatus in accordance with the present invention provided with internal baffles. As discussed supra, die 2 includes feed holes 16 and discharge passages 18 and 50 (not shown) leading to outer surface 4. However, within die 2 are a plurality of baffles 48 extending radially outwardly from core 46. Since the flow of material within the die is usually in plug form, these baffles reduce the cross-section of the soft extrudable material in any direction other than radial. This reduces or minimizes variations in batch material stiffness which can cause uneven extrusion rates around the die circumference. An alternative approach for producing a uniform extrudate is to place a rotatable spider (configured like the arrangement of FIG. 14 but with baffles 48 not contacting inner surface 44) in passage 20.

FIG. 15 is a magnified view of the portion of FIG. 1 within oval 15—15. As shown, outer surface 4 of die 2 is provided with circumferentially-extending discharge passages 18 which intersect longitudinally-extending discharge slots 50. Raised surfaces 51 are defined by the discharge passages and define the extrudate cells. Also shown in FIG. 15 are feed holes 16 which are aligned with some, but not all, of the intersections between discharge passages 18 and discharge passages 50. Portions of the discharge passages which are not in alignment with feed holes 16 are filled with material to be extruded as a result of lateral flow through the narrow discharge passages. The arrangement in FIG. 15 of feed holes with respect to discharge passages is one of many suitable configurations, any of which would be apparent to those or ordinary skill in the art. For example, feed holes could be aligned with more discharge passage intersections than that shown in FIG. 15 or at all such intersections. Alternatively, feed holes could be aligned with discharge passages where there are no intersections.

Figure 16:
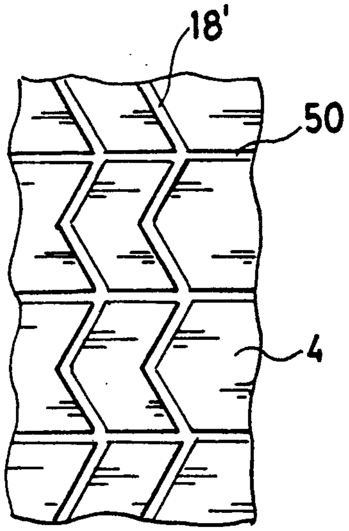
FIG. 16 is a magnified view of a first alternative die surface embodiment in accordance with the present invention.

FIG. 16 is a magnified view of one alternative die surface embodiment in accordance with the present invention. In this embodiment, outer surface 4 is provided with substantially linear discharge slots 50 as shown in FIG. 1. However, discharge slots 18′ have a zig-zag configuration.

Figure 17:
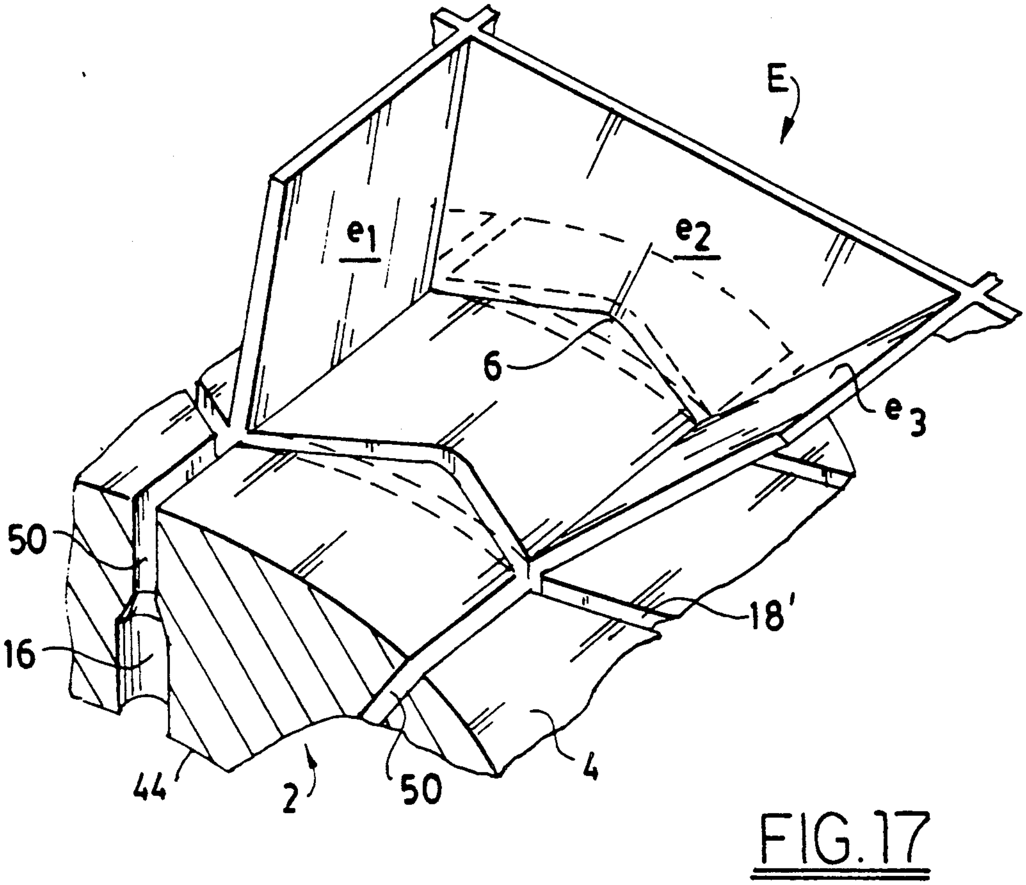
FIG. 17 is a perspective view of the extrusion of material through the structure shown in FIG. 16.

FIG. 17 is a perspective view of the extrusion of material through the configuration of FIG. 16. As depicted, material passing through feed holes 16 to discharge slots 18′ and 50 are advanced away from outer surface 4 as extrudate E. Extrudate E includes walls $e_1$, $e_2$, and $e_3$. Referring to walls $e_1$ and $e_3$, it is apparent that they are in planes which diverge as the distance from surface 4 increases. This is present in virtually every form of the present invention due to the circular cross-section of outer surface 4 and the radial direction of the circumferentially-extending discharge passages 18′ (and 18). With linear discharge slots, such extrudates (unless made of a stretchable material) tend to tear after they have moved a sufficient distance from the die. Thus, only thin sheets of honeycomb material can be formed in this fashion without significant risk of tearing. FIG. 17 shows that wall e, assumes the zig-zag configuration adjacent outer surface 4, but, as it moves away from that surface, wall $e_2$ becomes substantially planer. By providing discharge slot 18′ with a zig-zag configuration, extrusion can take place without the extrudate being torn due to stretching. Although such tearing could alternatively be prevented by use of a large diameter die, the capital cost of such a piece of equipment would be prohibitive.

Figure 18:
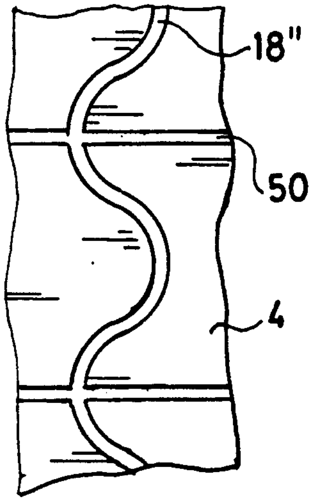
FIG. 18 is a magnified view of a second alternative die surface embodiment in accordance with the present invention.

FIG. 18 is a magnified view of an alternative die surface embodiment in accordance with the present invention. In this embodiment, discharge slot 1811 has a sinusoidal wave configuration which achieves substantially the same objective as the discharge slot configuration 18′ of FIG. 16.

Figure 19:
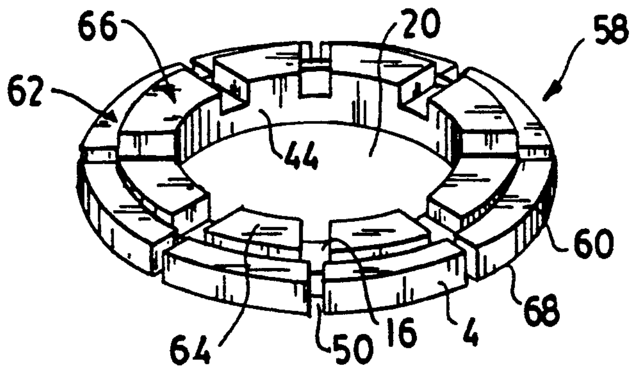
FIG. 19 is a perspective view of one embodiment of a rotary die washer element in accordance with the present invention.
Figure 20:
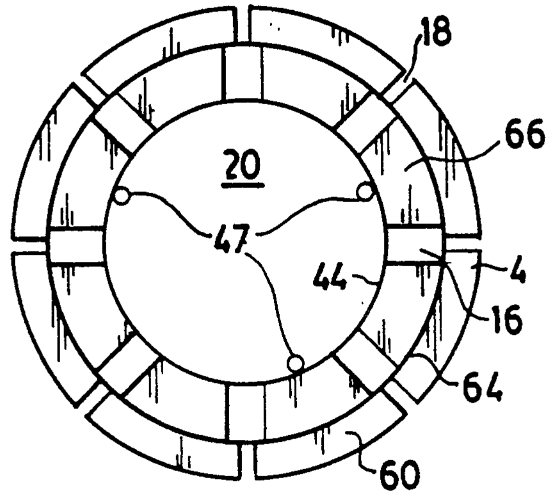
FIG. 20 is a top view of the rotary die washer element of FIG. 19.

FIG. 19 is a perspective view of a first embodiment of a die washer element in accordance with the present invention, while FIG. 20 is a top view thereof. Washer 58 has inner annular section 66 and outer annular section 62 which are unitary. Inner annular section 66 is provided with a plurality of radially-extending passages which define feed holes 16. Outer annular section 62 also has a plurality of radially-extending passages which define discharge passages 50. Discharge passages 50 are aligned with feed hole 16. As shown in FIG. 19, washer 58 has raised portions 64 in inner annular section 66 to form annular spaces between shelf 60 of outer annular section 62 and the opposite base side 68 of the adjacent abutting washer. This is particularly apparent from FIG. 21 which is a side view of a plurality of die washer elements operatively oriented with respect to each other. As depicted, base 68 of one washer abuts surface 64 of the adjacent washer to form discharge passages 18. Washers 58 can be positioned relative to one another either by brazing them together or by applying axial pressure to the group of washers defining extrusion die 2. Alternatively, aligning rods 47 (or other internal support structure), extending axially within chamber 20 formed by a plurality of washers 58 operatively aligned in accordance with FIG. 21, can be used for positioning. This is somewhat analogous to rods 147 shown in FIG. 23.

Figure 21:
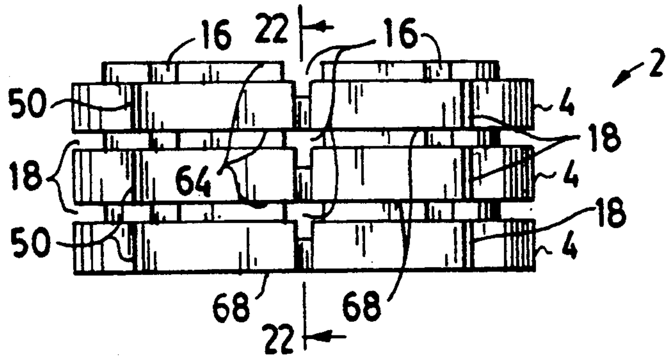
FIG. 21 is a side view of a plurality of the rotary die washer elements shown in FIG. 19 operatively oriented with respect to each other.
Figure 22:
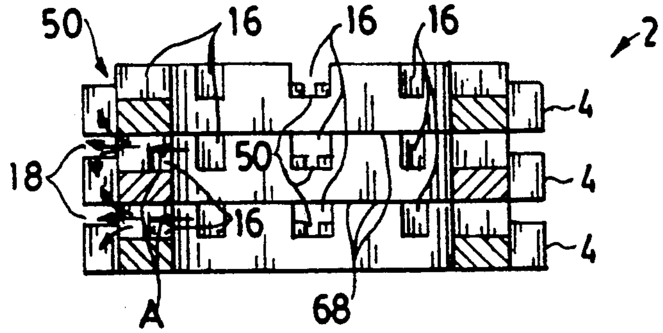
FIG. 22 is a side cross-sectional view of the embodiment of FIG. 21 taken along line 22—22.

FIG. 22 shows a side cross-sectional view of the embodiment of FIG. 21 taken along line 22—22. As depicted, material flows through feed holes 16 along the paths shown by arrows A and then into discharge passages 18 and 50 as depicted by the diverging arrows in FIG. 22.

Figure 23:
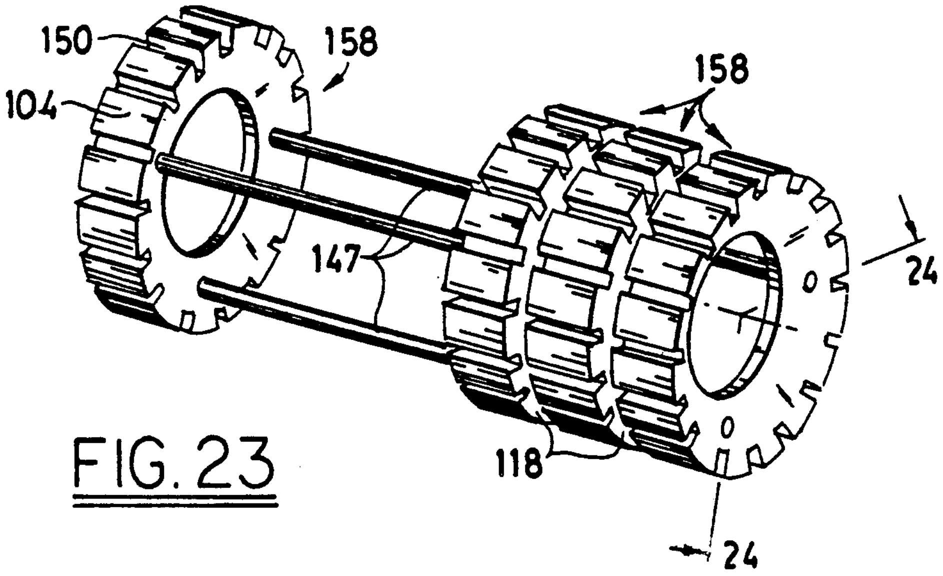
FIG. 23 is a perspective view of another embodiment of a rotary die with separate washer elements in accordance with the present invention.
Figure 24:
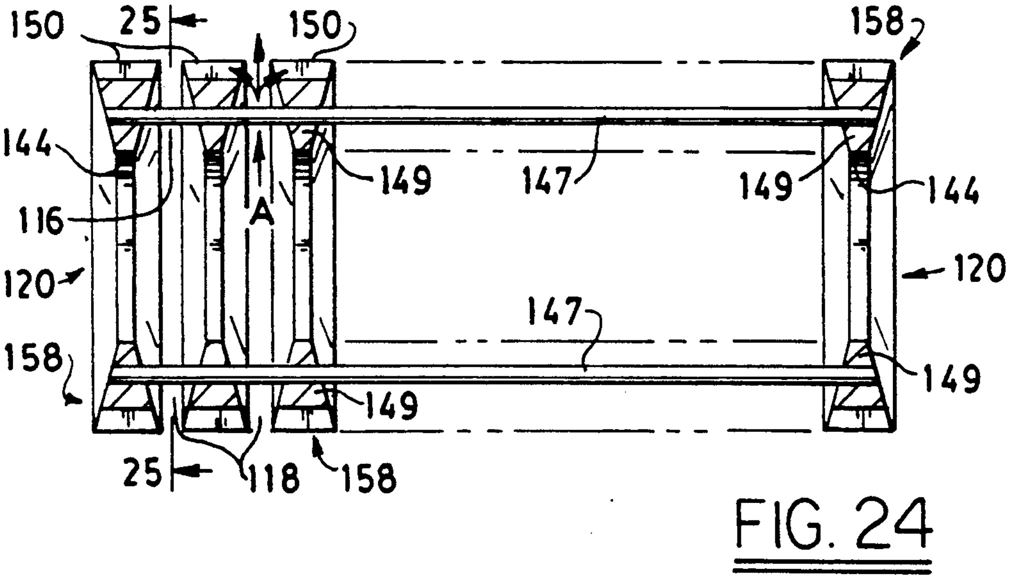
FIG. 24 is a side cross-sectional view taken along line 24—24 of FIG. 23.
Figure 25:
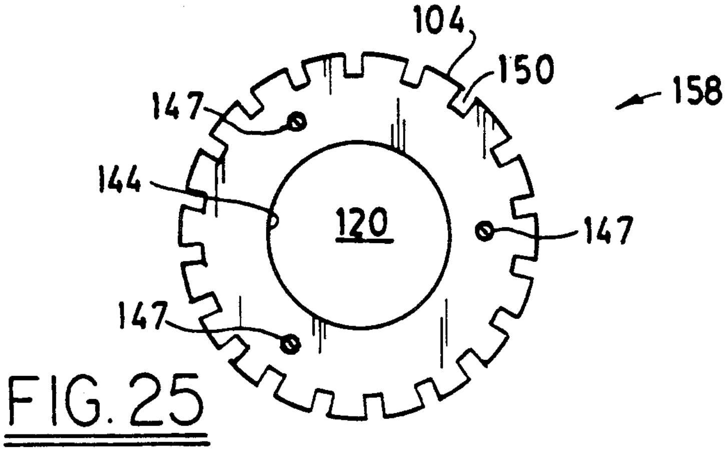
FIG. 25 is an end view of one washer element taken along line 25—25 of FIG. 24.

FIG. 23 is a perspective view of a second embodiment of a rotary die with separate washer elements in accordance with the present invention. Here, each washer element 158 is mounted on a plurality of longitudinally-extending rods 147. Each washer element includes a plurality of outer surface portions 104 separated by discharge passages 150. Provided between adjacent washer elements 158 are a plurality of discharge passages 118. This arrangement is shown in more detail in FIG. 24 which is a side cross-sectional view taken along line 24—24 of FIG. 23. Each washer 158 has a central opening defined by inner wall 144 which together with the other washers in that die form chamber 120. These central openings together with the spaces between adjacent washer elements 158 form wide feed holes 116. These feed holes in-turn lead to narrower discharge passages 118 which are formed by converging rims 149 of washer elements 158. This convergence causes increasing resistance to batch flow in the direction of discharge slots 118 and promotes lateral movement into discharge passages 150. This is desirable, because the flow of material in passages 118 and 150 will tend to knit or fuse as continuous walls. Material being extruded follows the path defined by arrow A from chamber 120 and feed holes 116 to discharge passages 118, and ultimately to discharge passages 150. Another view of this configuration is shown in FIG. 25 which is an end view of one washer element taken along line 25—25 of FIG. 24.

Figure 26:
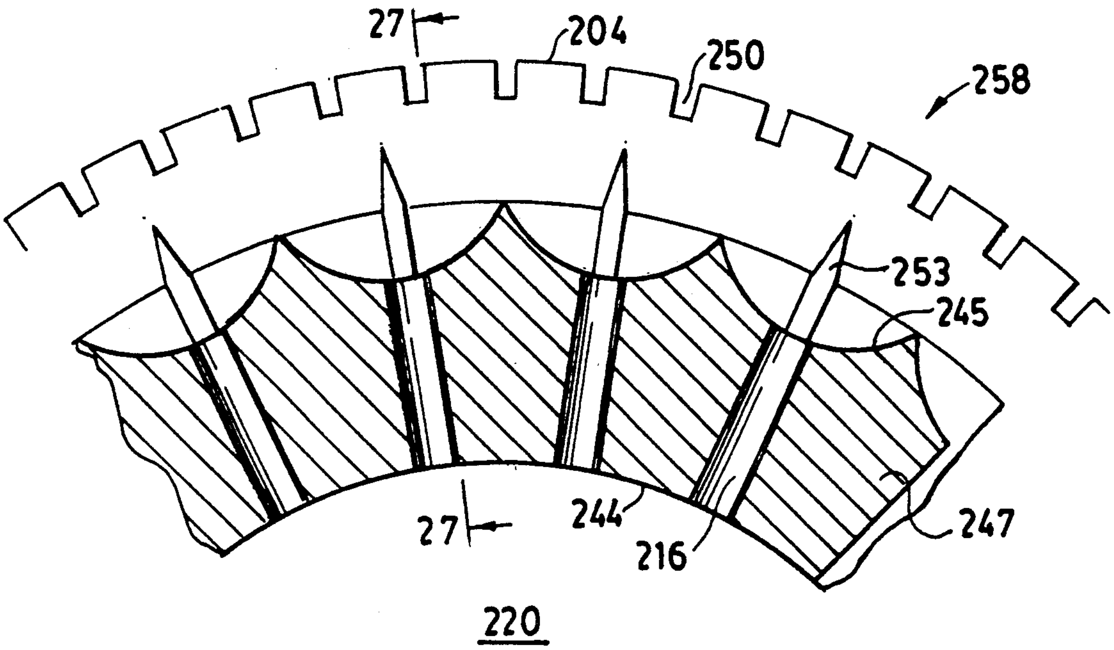
FIG. 26 is a side view of another embodiment of a rotary die with washers.
Figure 27:
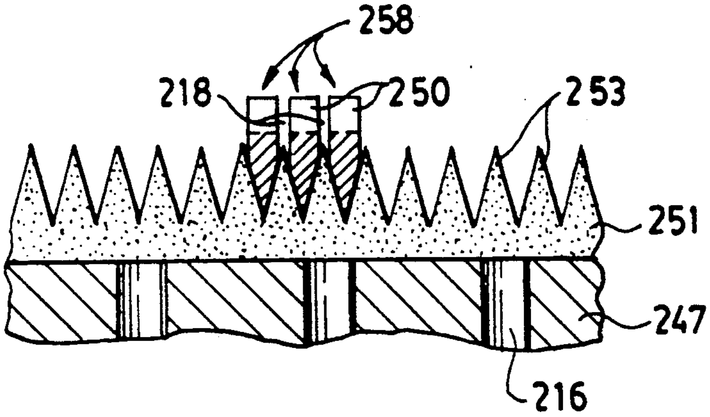
FIG. 27 is an end cross-sectional view taken along line 27—27 of FIG. 26.

FIG. 26 is a side view of another embodiment of a rotary die with washer elements. FIG. 27 is a cross-sectional view taken along line 27—27 of FIG. 26. In this embodiment, a plurality of washer elements 258 are mounted on pipe 247 having a plurality of radially-extending and circumferentially-spaced feed holes 216. Each washer element has outer surfaces 204 separated by discharge passages 250. Between each washer element 258 is a discharge passage 218. In this embodiment, material passing through chamber 220 within pipe 247 advances outwardly through feed holes 216 to discharge passages 218. As this material moves radially outward, it enters discharge passages 250, and, as time passes, the extrudate assumes a honeycomb configuration.

Here, a plurality of circumferentially disposed spacer elements 251 are provided to position washer elements 258. Each spacer element has a plurality of teeth 253 having gaps between them which are complimentary to triangular rims of washer elements 258, thereby mainstaining washer element 258 in proper position. Passage 220 is defined by inner surface 244 of pipe 247 with feed holes 216 leading radially away from passage 220. Feed holes 216 lead to recesses 245 which spread material being extruded to a plurality of discharge passages 218 and 250. These discharge passages, like those shown in other embodiments of the present invention, are substantially provided in outer surface 204. Instead of the rounded cross-sectional configuration shown in FIG. 26, recesses 245 also can have a substantially linear cross-section. Further, washer elements 258 can be tapered like washer elements 158 in the embodiment shown in FIGS. 23-25.

Figure 28:
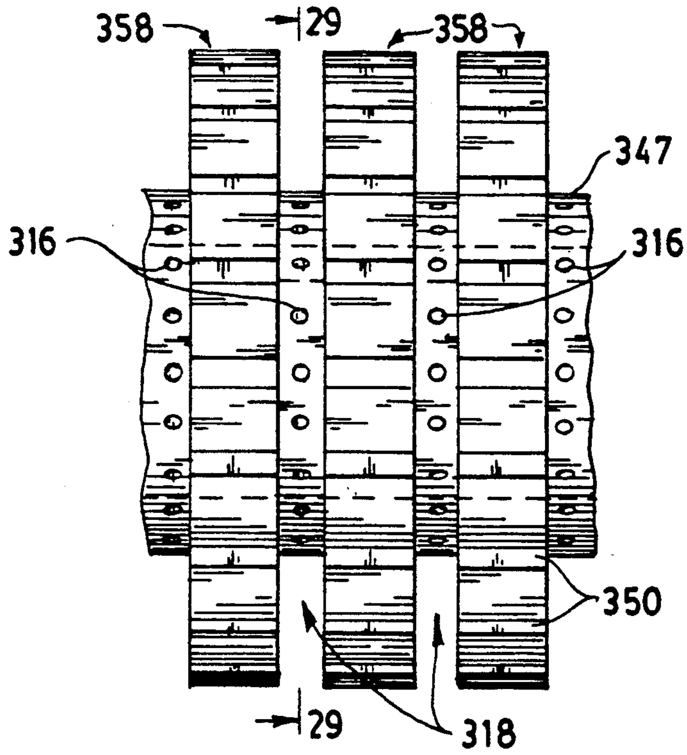
FIG. 28 is a side view of a modified version of the rotary die of FIG. 26.
Figure 29:
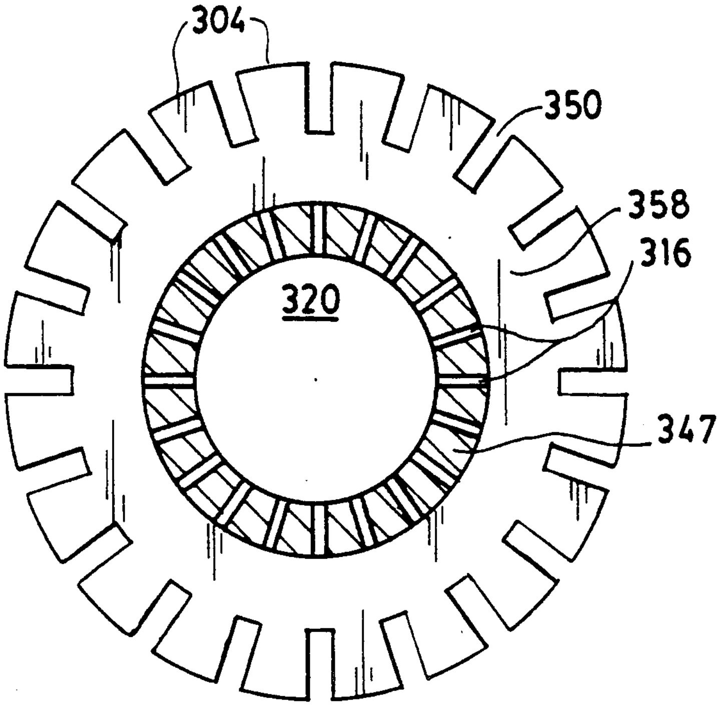
FIG. 29 is an end view of one washer element taken along line 29—29 of FIG. 28.

FIG. 28 is a side view of a modified version of FIG. 26's rotary die with washer elements, while FIG. 29 is a cross-sectional view taken along line 29—29 of FIG. 28. In this embodiment, a plurality of washer elements 358 are mounted on pipe 347 having a plurality of radially-extending and circumferentially-spaced feed holes 316. Each washer element has outer surfaces 304 separated by discharge passages 350. Between each washer element 358 is a discharge passage 318. In this embodiment, material passing through chamber 320 within pipe 347 advances outwardly through feed holes 316 to discharge passages 318. As material moves radially outward, it enters discharge passages 350, and, as time passes, the extrudate assumes a honeycomb configuration.

The washer element embodiments of FIGS. 19-29 are particularly useful when discharge passages 18 are to be provided with zig-zag or sinusoidal configurations like those of FIGS. 16-18. Such passages can be provided by machining the axial edges of each washer with the desired configuration.

Figure 30:
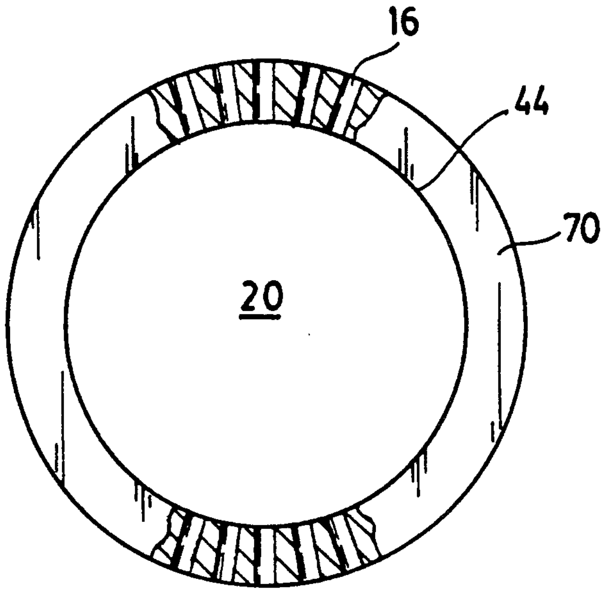
FIG. 30 is a cross-sectional view of an inner rotary die pipe in accordance with one form of the present invention.
Figure 31:
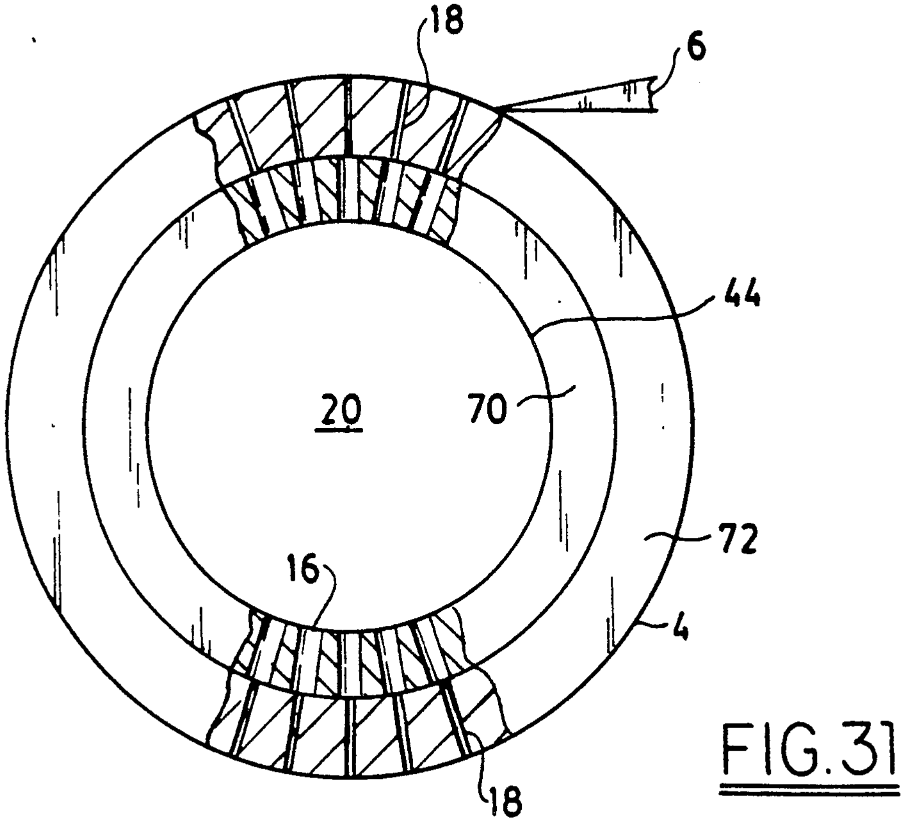
FIG. 31 is a cross-sectional view of the pipe of FIG. 30 around which an outer pipe has been formed.

FIG. 30 is a side cross-sectional view of a base rotary die pipe in accordance with one form of the present invention. FIG. 31 is a cross-sectional view of the pipe of FIG. 30 around which an outer pipe has been formed. Together, FIGS. 30 and 31 disclose a procedure for producing one form of the rotary die of the present invention. Specifically, such fabrication begins with providing a base conduit 70 having an inner chamber 20 defined by inner surface 44. Feed holes 16 are formed by drilling them through base conduit 70 starting from the outside of base conduit 70. Next, outer conduit 72 is formed on or slipped over base conduit 70 by procedures well known in the art to form the arrangement shown in FIG. 31. Discharge passages 18 and 50 (not shown) are then cut through outer conduit 72 starting at outer surface 4. This procedure would be followed where outer conduit 72 is made integral with base conduit 70 (e.g., by brazing). However, when outer conduit 72 is slip or shrink fitted over base conduit 70, discharge passages 18 would extend through conduit 72, while passages 50 would not to preserve the integrity of outer conduit 72. Cutter 6 is then placed proximate to outer surface 4 to permit removal of honeycomb extrudate in sheet form, as discussed supra.

Figure 32:
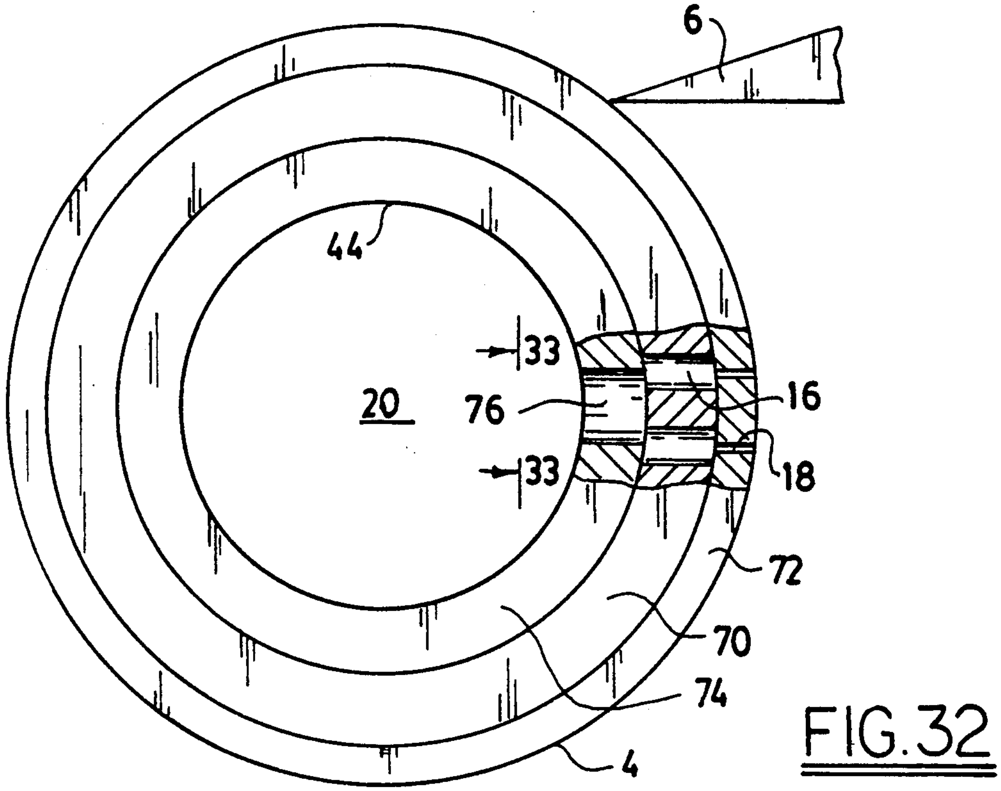
FIG. 32 is a cross-sectional view of a modified version of the pipes of FIGS. 30 to 31.
Figure 33:
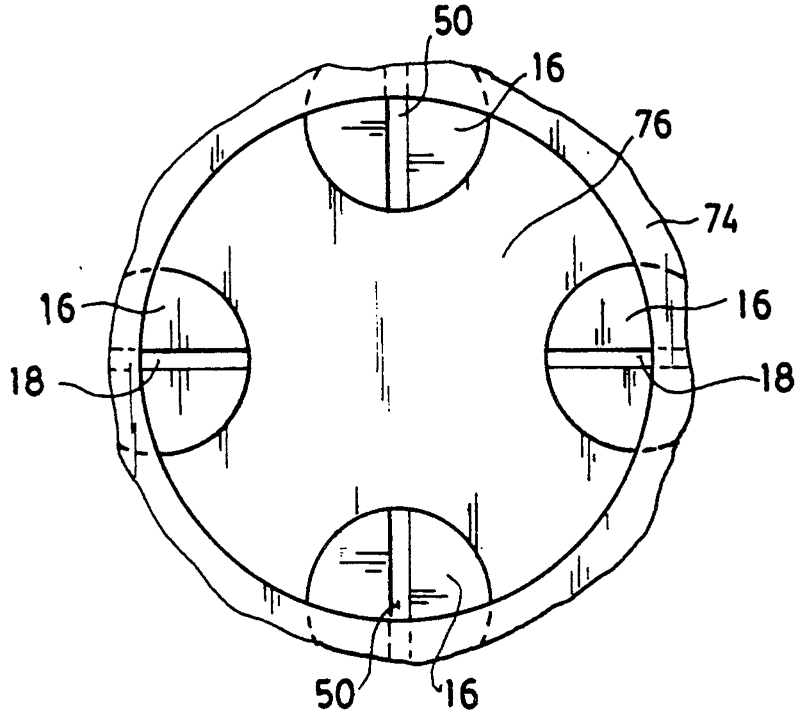
FIG. 33 is a side view taken along line 33—33 of FIG. 32.

FIG. 32 is a cross-sectional view of a modified version of the configuration shown in FIGS. 30-31. In this embodiment, fabrication begins with the formation of inner conduit 74 whose inner surface defines chamber 20. Supply passages 76 are then drilled from the exterior of inner conduit 74 to chamber 20. Next, base conduit 70 is formed on or slipped over inner conduit 74 by well known procedures. Feed holes 16 are then drilled from outside base ring 70. As discussed with respect to FIG. 31, outer conduit 72 is formed next with discharge passages 18 and 50 (not shown) subsequently cut through outer surface 4. Supply passages 76, feed holes 16, and discharge passages 18 and 50 (not shown) are aligned to permit material to flow from chamber 20 to outer surface 4. The configuration of these passages and holes is shown in FIG. 33 which is a side cross-sectional view taken along line 33—33 of FIG. 32.

Figure 34:
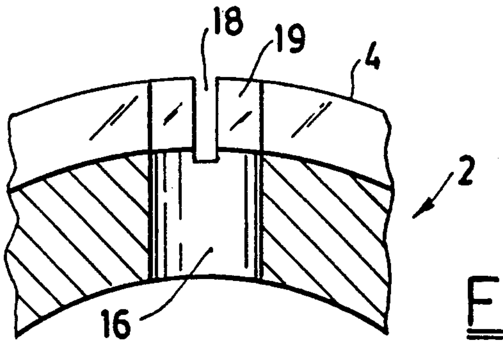
FIG. 34 is a cross-sectional view of one drilled feed hole embodiment in accordance with the present invention.
Figure 35:
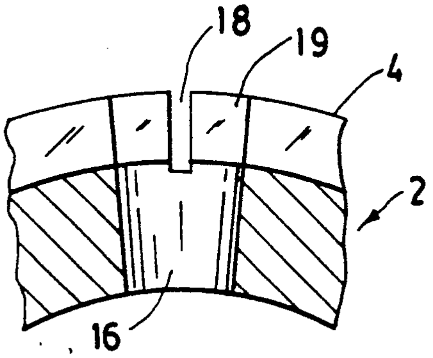
FIG. 35 is a cross-sectional view of another drilled feed hole embodiment in accordance with the present invention.
Figure 36:
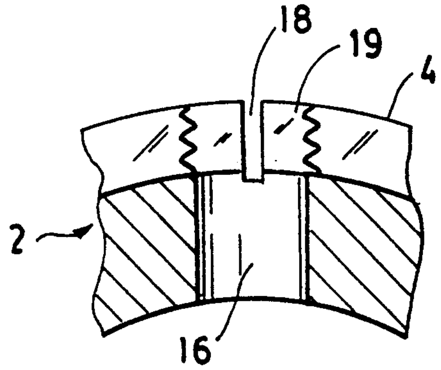
FIG. 36 is a cross-sectional view of another drilled feed hole embodiment in accordance with the present invention.

FIGS. 34 to 36 depict cross-sectional views of various forms of drilled feed hole arrangements leading to discharge passages at outer surface 4. FIG. 34 shows substantially cylindrical feed holes 16 which have been drilled from the exterior of die 2. The portion of the feed holes proximate outer surface 4 is then filled with a short pin or rod, designated by reference numeral 19, to provide a smooth outer surface. Discharge passages 18 and 50 (not shown) are then cut in filled outer surface 19 to a depth at which at least some of the discharge slots intersect feed holes 16. FIG. 35 is similar to FIG. 34 except that the former shows a feed hole 16 which is tapered. FIG. 36 has a feed hole arrangement substantially similar to that of FIG. 34 except that it is provided with a threaded surface which is used to receive threaded filling stud 19. After the stud is placed in position in die 2, discharge passages are cut into stud 19 in substantially the same way as in the embodiments of FIGS. 34–35.

Figure 37:
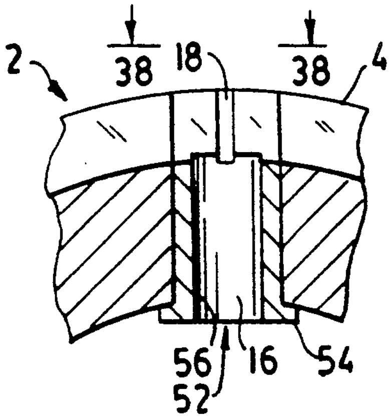
FIG. 37 is a cross-sectional view of one embodiment of a pin feed hole arrangement in accordance with the present invention.
Figure 38:
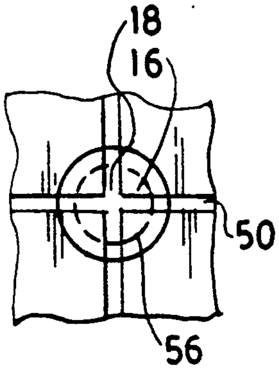
FIG. 38 is a top view of the pin feed hole embodiment taken along line 38—38 of FIG. 37.

FIG. 37 is a cross-sectional view of an alternative feed hole embodiment. In this arrangement, instead of drilling feed holes corresponding to the precise size required, larger holes are drilled and then filled with pins having internal passages drilled precisely to the required size and having closed ends which fill the holes at outer surface 4 to provide a smooth exterior. Next, discharge passages 18 and 50 (not shown) are cut in the outer surface through the closed ends of the pins and into feed hole 16. As a result, the discharge passages intersect the feed holes. In FIG. 37, straight pin 52, having cylindrical section 56 connected to shoulder section 54, is inserted into holes drilled in die 2. Shoulder section 54 keeps pin 52 in position, while the lumen of pin 52 forms feed hole 16 leading to discharge slots 18 and 50 (not shown). FIG. 38 is a top view of the embodiment of FIG. 37 taken along line 38—38.

Figure 39:
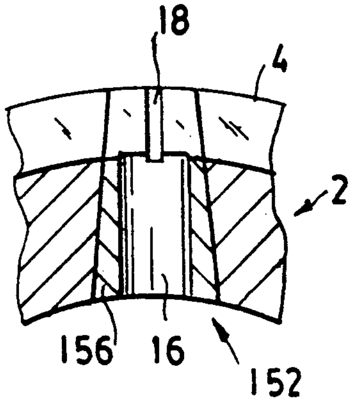
FIG. 39 is a cross-sectional view of another embodiment of a pin feed hole arrangement in accordance with the present invention.

FIG. 39 is a cross-sectional view of a second embodiment of a pin feed hole arrangement in accordance of the present invention. This pin is installed in a manner similar to that shown in FIGS. 37-38. Here, tapered pin 152 is reamed into a correspondingly shaped hole drilled into die 2. Tapered pin 152 is provided with tapered wall section 156 with a lumen which defines feed hole 16.

The straight or tapered pins of FIGS. 37-39 can be secured to die 2 by soldering or brazing.

Figure 40:
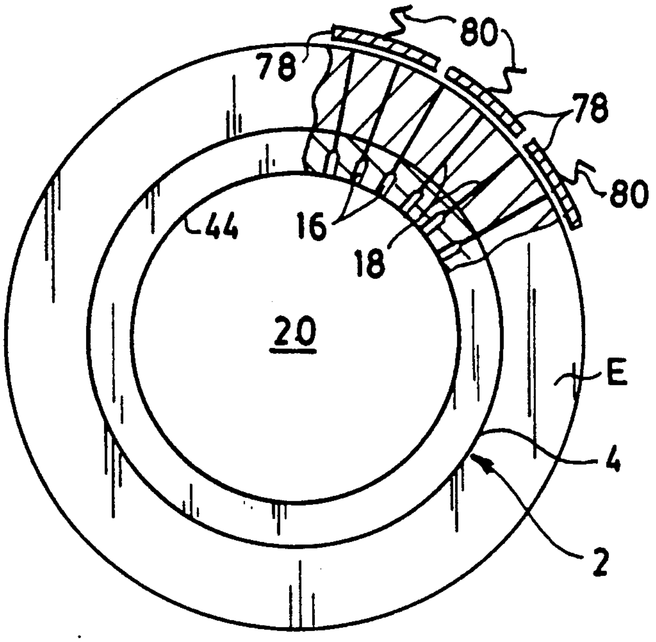
FIG. 40 is a cross-sectional view of a rotary die in accordance with the present invention with external pressure application structure.

FIG. 40 is a side cross-sectional view of a rotary die in accordance with the present invention with one form of external pressure application structure. This arrangement is substantially the same as that shown in FIGS. 3, 6, 8, 9, 10, and 11, except that the embodiment of FIG. 40 is provided with a plurality of pressure application plates 78 urged toward outer surface 4 by springs 80. Initially, the pressure application plates are very close to outer surface 4, but, as extrudate begins to emerge from die 2, plates 78 move outwardly to form honeycomb sheets of suitable thickness. These plates simply insure that discharge passages 18 and 50 are substantially filled with material before extrudate is advanced away from outer surface 4.

Figure 41:
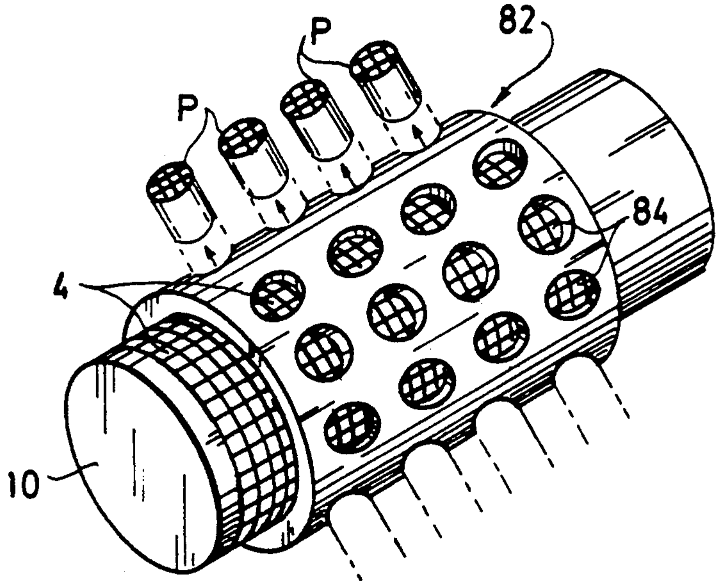
FIG. 41 is a perspective view of part of a cover placed around the rotary die of the present invention to produce honeycomb pellets.
Figure 42:
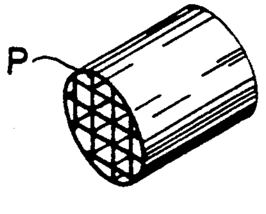
FIG. 42 is a perspective view of a honeycomb pellet produced in accordance with FIG. 41.

FIG. 41 is a perspective view of part of a cover (usually made of metal) placed around the rotary die of the present invention to produce honeycomb pellets P. In this embodiment, cover 82 is placed over die 2 and in contact with outer surface 4. During extrusion, this arrangement causes extrudate moving away from outer surface 4 to pas& through holes 84 as a cylindrical honeycomb which is cut into pellets P, as shown in FIG. 42. In FIG. 41, part of outer surface 4 is left unsurrounded by cover 82 for illustrative purposes; in actual use, cover 82 is around all of die 2.

With any of the above-described forms of the present invention, the extrudate may deform during extrusion or cutting or subsequently. It is, therefore, desirable to harden or toughen the extrudate so that it is more resistant to deformation or tearing. Various methods (known in the art) can be used to accomplish this objective depending on the material being extruded.

EXAMPLE

A rotary extrusion die assembly was built for attachment to a ten inch ram extruder. The die assembly was designed to rotate about a central shaft supported by a spider which was attached to the ram extruder. The ram extruder remained stationary and the die assembly rotated independently of the extruder. The assembly was provided with seals to prevent leakage of batch material at high extrusion pressures. The rotating die was driven by a floor mounted variable speed electric motor and gear reducer with a sprocket. That sprocket received a chain which drove a second sprocket attached to and located at the rear of the rotary die assembly. The SP rockets and chain were shielded for safety.

The extrusion die was machined from steel pipe 28.575 cm in outer diameter with an inner diameter of 22.225 cm. Outer passages 0.031 cm wide were cut 0.726 cm deep in the outer surface of the pipe with slotting saws. The passages were located every 1.5 degrees radially and every 0.363 cm axially along the die. 0.254 cm diameter holes 2.680 cm deep were present inside of the pipe to intersect every other slot intersection.

An extrusion batch, containing clay, talc, and alumina and prepared substantially in accordance with Example 3E of U.S. Pat. No. 3,885,977, can be extruded through the die of this Example with a ram-type extruder, in accordance with conventional procedures. In one experiment, the dry ingredients of such batch were mixed in a Littleford blender and transferred to a muller type mixer where water was added and the batch was plasticized. The batch was then extruded twice through a die containing 0.318 cm holes.

The batch was then loaded into the ram extruder and pushed at 1700 psi with the die rotating at 6 rpm. The extrudate was removed as two sheets by two cutters placed at the surface of the die with an angular spacing of about 20° to make a cellular sheet about 1 cm thick between the two cutters. The rest of the extruded batch was saved for recycling or discarded.

Although the invention has been described in detail for the purpose of illustration, it is understood that such detail is solely for that purpose, and variations can be made therein by those skilled in the art without departing from the spirit and scope of the invention which is defined by the following claims.

What is claimed:

1. A method of forming honeycomb structures in sheet form comprising:

providing an extrusion system comprising:

an extrusion die with a continuous outer surface and having intersecting passages configured to discharge material extruded from said extrusion die in a honeycomb configuration and cutting means positionable proximate to the outer surface of said extrusion die to cut material extruded through the intersecting passages;

advancing formable material to said extrusion die, through the intersecting passages, and outwardly from the outer surface to form a honeycomb extrudate; and imparting relative rotation between said extrusion die and said cutting means, whereby said cutting means removes the honeycomb extrudate from the outer surface of said extrusion die as an elongate sheet.

2. A method according to claim 1, wherein the continuous outer surface has a longitudinally-extending, cylindrical configuration, said cutting means extends substantially parallel to the longitudinal extent of the outer surface, and the intersecting passages include a first set of discharge passages extending circumferentially around said extrusion die with each of said first set of discharge passages being longitudinally spaced along the length of the extrusion die and a second set of discharge passages extending across the length of the extrusion die with each of the second set of discharge passages being spaced around its circumference.

3. A method according to claim 2 further comprising: sintering the elongate sheet of the formable material.

4. A method according to claim 3, wherein the honeycomb extrudate has a cell density of 0.155 to 248 cells per square centimeter.

5. A method according to claim 2, wherein said imparting relative rotation is achieved by maintaining said cutting means substantially stationary and rotating said extrusion die.

6. A method according to claim 2, wherein said imparting relative rotation is achieved by maintaining said extrusion die substantially stationary and rotating said cutting means.

7. A method according to claim 2, wherein said cutting means is a single knife which removes a single elongate sheet of the honeycomb extrudate.

8. A method according to claim 2, wherein said cutting means is a plurality of knives spaced around the outer surface of said extrusion die each of which removes a single elongate sheet of the honeycomb extrudate.

9. A method according to claim 2, wherein said extrusion system further comprises:

an external mask covering a portion of the outer surface of said extrusion die, whereby the honeycomb extrudate is formed only at the portions of the outer surface which are not covered by said external mask.

10. A method according to claim 2, wherein said extrusion system further comprises:

an internal mask within said extrusion die and positioned to permit the honeycomb extrudate to form only at selected portions of the outer surface.

11. A method according to claim 2, wherein the honeycomb extrudate contains walls defining a plurality of cells which widen during said advancing as the honeycomb extrudate moves away from the outer surface.

12. A method according to claim 1, wherein the honeycomb extrudate emerges from the outer surface, during said advancing, with walls defining the cells projecting into the cells in a sine wave configuration.

13. A method according to claim 11, wherein the honeycomb extrudate emerges from the outer surface, during said advancing, with walls defining the cells projecting into the cells in a zig-zag wave configuration.

14. A method of forming honeycomb structures in ring form comprising:

providing an extrusion system comprising:

an extrusion die with a longitudinally-extending cylindrical outer surface having intersecting passages configured to discharge material extruded from said extrusion die in a honeycomb configuration and cutting means having a cylindrical configuration coaxial with said extrusion die, wherein said cutting means has a central opening sufficiently wide to receive the outer surface of said extrusion die, said cutting means having a circumferential sharp edge which defines one end of the opening;

advancing formable material to said extrusion die, through the intersecting slots, and outwardly from the outer surface to form a honeycomb extrudate; and imparting relative axial movement between said cutting means and said extrusion die throughout the outer surface, whereby the sharp edge removes a ring-shaped honeycomb extrudate from the outer surface.

15. A method of forming honeycomb structures in pellet form comprising:

providing an extrusion system comprising:

an extrusion die with a continuous outer surface and having intersecting passages configured to discharge material extruded from said extrusion die in a honeycomb configuration;

cutting means positionable proximate to the outer surface of said extrusion die to cut material extruded through the intersecting passages; and a covering having a plurality of holes and positioned over the outer surface;

advancing formable material to said extrusion die, through the intersecting passages, outwardly from the outer surface, and through the holes of said covering to form a honeycomb extrudate; and imparting relative rotation between said extrusion die and said cutting means, whereby said cutting means removes the honeycomb extrudate from said covering in pellet form during said imparting relative rotation.

* * * * *

UNITED STATES PATENT AND TRADEMARK OFFICE

CERTIFICATE OF CORRECTION

PATENT NO. : 5,314,650

DATED : May 24, 1994

INVENTOR(S) : M. D. W. Adler, R. D. Bagley, R. I. Frost, J. G. Lanning, H. G. Shafer It is certified that error appears in the above-indentified patent and that said Letters Patent is hereby corrected as shown below:

Col. 3, line 13, "view-of" should be "view of"

Col. 8, line 27, "e," should be "$e_2$"

Col. 8, line 38, "1811" should be "18''"

Col. 11, line 61, "pas&" should be "pass"

Col. 12, line 18 delete "SP"

Col. 12, line 19, "rocket" should be "sprocket"

Column 13, line 52, "l" should read "11"

Signed and Sealed this

Sixteenth Day of May, 1995

Attest:

Bruce Lehman

BRUCE LEHMAN

*Attesting Officer* *Commissioner of Patents and Trademarks*